G. R. OSBORN & B. A. DRAYTON.
BIRD-CAGE HOOK.
Reissued May 23, 1876.
No. 7,134.
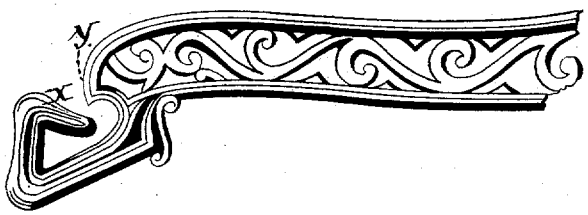
Witnesses:
Harry W. Lawrence,
E. J. B. Gunning
Inventors:
George R. Osborn,
Benj. A. Drayton.
N. PETERS, PHOTO-LITHOGRAPHER, WASHINGTON, D. C.

UNITED STATES PATENT OFFICE.

GEORGE R. OSBORN, OF EAST ORANGE, NEW JERSEY, AND BENJAMIN A. DRAYTON, OF NEW YORK, N. Y.

IMPROVEMENT IN BIRD-CAGE HOOKS.

Specification forming part of Letters Patent No. 169,571, dated November 2, 1875; reissue No. 7,134, dated May 23, 1876; application filed January 29, 1876.

DIVISION B.

*To all whom it may concern:*

Be it known that we, GEORGE R. OSBORN, of East Orange, county of Essex, and State of New Jersey, and BENJAMIN A. DRAYTON, of the city and State of New York, have invented a new and useful Improvement in Bird-Cage Hook; and the following is a full description of the same, reference being had to the accompanying drawing, forming a part of this specification, in which the figure represents the form and construction.

The object of our invention is to insure safety to bird-cages or other articles similarly suspended upon a projecting bracket.

The invention consists in the arrangement of a series of guards over the suspending point or bearing within the hook, to prevent the article suspended from becoming displaced.

The usual form of hooks for this purpose is a simple half-circle, from which the suspended article can be easily dislodged by accident; but it will be observed that in our invention a cage can be lifted on or off easily, and, if it is suddenly struck from below, cannot be dislodged as from the ordinary hook alluded to.

When the cage is suddenly raised the ring will almost invariably strike the first guard, (shown at *x* in the drawing.) If it misses it, the second guard, (shown at *y*,) is sure to arrest it.

We do not confine ourselves to the exact form shown, as it is obvious that many modifications may be adopted without departing from the spirit of our invention.

What we claim, and desire to secure by Letters Patent, is—

A suspension-bracket having a hook provided with a guard or guards arranged to form an indirect passage or outlet from the suspending-point, substantially as shown and described.

GEORGE R. OSBORN.
BENJ. A. DRAYTON.

Witnesses:
CHAS. E. HECOX,
HARRY W. LAWRENCE.